United States Patent [19]
Zucker

[11] Patent Number: 4,905,084
[45] Date of Patent: Feb. 27, 1990

[54] COMPATIBLE AND SPECTRUM EFFICIENT HIGH DEFINITION TELEVISION

[75] Inventor: Leo Zucker, Yorktown Heights, N.Y.

[73] Assignee: Carole Broadcasting Technologies, Inc., White Plains, N.Y.

[21] Appl. No.: 303,917

[22] Filed: Jan. 30, 1989

[51] Int. Cl.[4] .................. H04N 7/04; H04N 7/08; H04N 11/20; H04N 11/06
[52] U.S. Cl. ..................... 358/141; 358/11; 358/12; 358/142; 358/15
[58] Field of Search .................. 358/11, 12, 141, 142, 358/88, 186, 187, 15, 144

[56] References Cited
U.S. PATENT DOCUMENTS

| | | | |
|---|---|---|---|
| 2,820,844 | 1/1958 | Beers | 358/15 |
| 3,617,626 | 11/1971 | Bluth et al. | 358/311 |
| 3,830,971 | 8/1974 | van de Polder | 358/140 |
| 4,389,668 | 6/1983 | Favreau | 358/140 |
| 4,429,327 | 1/1984 | Oakley et al. | 358/12 |
| 4,485,401 | 11/1984 | Tan et al. | 358/12 |
| 4,521,803 | 6/1985 | Gittinger | 358/12 |
| 4,535,352 | 8/1985 | Haskell | 358/16 |
| 4,567,508 | 1/1986 | Hulyer | 358/11 |
| 4,574,300 | 3/1986 | Hulyer | 358/11 |
| 4,605,950 | 8/1986 | Goldberg et al. | 358/141 |
| 4,622,578 | 11/1986 | Rzeszewski | 358/12 |
| 4,694,338 | 9/1987 | Tsinberg | 358/141 |
| 4,707,728 | 11/1987 | Hurst | 358/12 |
| 4,720,744 | 1/1988 | Washi et al. | 358/141 |

FOREIGN PATENT DOCUMENTS
0114694  11/1984  European Pat. Off. .

OTHER PUBLICATIONS
M. Javid & P. M. Brown, Field Analysis and Electromagnetics, pp. 293-294 (McGraw-Hill 1963).
R. C. Johnson & H. Jasik, Antenna Engineering Handbook, pp. 23-4 to 23-11 (McGaw-Hill 1984).
R. Angus, "The HDTV Revolution", Popular Electronics, p. 61 et seq, Sep. 1989.
Advertisement for the NEC model IDC-1000 Improved Definition Converter, AV Video at p. 33, Feb. 1989.

*Primary Examiner*—John K. Peng
*Attorney, Agent, or Firm*—Leo Zucker

[57] ABSTRACT

High definition television (HDTV) signals are broadcast in a manner to be compatible with television receivers that operate to reproduce standard definition images, and the broadcast HDTV signals are contained within an existing frequency band in the electromagnetic spectrum allocated for transmission of the standard definition images. An image to be broadcast is scanned with a high definition camera capable of producing an image frame of N lines of resolution, wherein N is equal to about twice the line resolution of a standard definition image frame. The camera produces N/2 odd line image signals and N/2 even line image signals for each image frame. The odd line signals are modulated on a radio frequency (RF) carrier wave to produce HDTV odd line image signals occupying at most the same frequency band in the electromagnetic spectrum as occupied by standard definition images. The even line signals are modulated on a RF carrier wave signal to produce HDTV even line image signals that occupy at most the same frequency band. The HDTV odd line image signals are radiated from a first transmitting antenna to produce first radiated waves of a first polarization, and the HDTV even line image signals are radiated from a second transmitting antenna to produce second radiated waves of a second polarization mutually orthogonal with the first polarization. Reception of HDTV images is carried out with mutually orthogonally polarized antennas matched to the first and the second radiated waves.

27 Claims, 4 Drawing Sheets

COMPATIBLE AND SPECTRUM EFFICIENT HIGH DEFINITION TELEVISION

BACKGROUND OF THE INVENTION

1. Field of the Invention

The present invention relates to advanced television (ATV) systems; and particularly to a terrestrial high definition television (HDTV) broadcast system and method utilizing properties of radiated electromagnetic waves and antenna technology to ensure compatibility with existing television receivers, and without additional frequency spectrum allocations.

2. Discussion of the Known Art

A. Current ATV Regulation Policy

On Sep. 1, 1988, the Federal Communications Commission (FCC) released a Tentative Decision and Further Notice of Inquiry (NOI), FCC 88-288, with respect to an ongoing review of Advanced Television Systems and Their Impact on the Existing Television Broadcast Service (MM Docket No. 87-268). A summary of the NOI is printed in the Federal Register of Oct. 3, 1988, 53 FR 38747-49. As described in the NOI, current state of the art *non-broadcast* television techniques provide picture resolution and color approaching that obtainable with 35 mm film.

The FCC determined that the public would benefit from a terrestrial broadcast ATV service, but that most systems currently proposed by industry had one or more of the following disadvantages 1. Non-compatibility with existing color television receivers manufactured according to the United States 30 frame per second, two-field interlaced scan, 525 line NTSC (National Television System Committee) color standard, adopted in 1953.

2. A requirement of more than six megahertz bandwidth for transmission of the entire ATV signal, thus exceeding the currently allocated terrestrial television broadcast channel bandwidth if the proposed ATV signal is modulated and broadcast on a radio frequency carrier wave.

3. For those proposed ATV systems categorized as compatible with existing receivers, picture resolution is diminished when received on a standard television set, and/or the quality of the picture when reproduced on a "high definition" receiver is degraded during movement of the televised image.

The FCC concluded that any broadcast standards for a new ATV terrestrial service shall be such as to overcome (1) and (2) above. That is, an approved system will be one that is compatible with the many existing color television receivers now in use in the United States so as not to make them suddenly obsolete, and one that will not require additional broadcast frequency allocations to realize maximum picture definition.

The requirement that the existing broadcast television frequency allocations be used for an ATV broadcast service, is dictated both from an administrative and a technical point of view. First, any additional required spectrum might be at the expense of another (non-television) allocated service and would require lengthy hearings to obtain. Second, the additional spectrum might be so far removed in wavelength from existing television channel frequencies on which the "compatible" parts of ATV signals must be broadcast, that differences in propagation characteristics would likely degrade, rather than enhance, the received picture quality.

B. Patented Compatible ATV Techniques

U.S. Pat. No. 4,521,803 issued June 4, 1985, discloses a system for compatible transmission of high-resolution television. Basically, a high resolution (e.g., 1050 line) television camera simultaneously produces signals corresponding to a pair of adjacent scanned lines of an image. To provide a compatible 525 line picture for reception by existing receivers, luminance and chrominance signals for each scanned pair of adjacent lines are additively combined and broadcast at the conventional line frequency rate of about 15,750 lines per second. The luminance signals for each adjacent line pair are also subtracted from one another to produce difference signals that modulate a carrier phased in quadrature with the luminance carrier of the broadcast television signal. Suitable decoding equipment in a "high definition" television receiver would derive luminance signals for each of the 1050 scanned lines by detecting and processing the additively combined and difference signals, according to the patent.

Another compatible HDTV system utilizing a high-resolution vidicon capable of 1050 line resolution, is disclosed in U.S. Pat. No. 4,707,728 issued Nov. 17, 1987. According to the patent, a difference or "delta" signal representative of fine picture detail is transmitted during the vertical blanking interval, and a suitably equipped receiver detects and combines the delta signal with received limited bandwidth signals, to reproduce a high-definition picture. Maximum definition is obtainable only for still images at the receiver, however, since transmission of the delta signal is inhibited during frame-to-frame motion of the televised image.

C. Principles of the Present Invention

As far as is known, no system or technique has been proposed that utilizes physical properties of radiated electromagnetic waves and antenna technology, to enable broadcasting of HDTV signals compatible with existing television receivers and confined within the currently allocated spectrum for the terrestrial broadcast television service.

It is known generally that if mutually orthogonal linearly polarized transverse electromagnetic (TEM) waves, e.g., one horizontally polarized and the other vertically polarized, are transmitted in free space at the same frequency or wavelength, different information modulated on each of the waves can be separately received and demodulated by use of correspondingly polarized receiving antennas. See M. Javid & P.M. Brown, Field Analysis and Electromagnetics, at 294 (McGraw-Hill 1963).

R.C. Johnson and H. Jasik, in their Antenna Engineering Handbook (McGraw-Hill 1984), point out (at page 23-9) that "[f]or any arbitrarily polarized antenna, there can be another antenna polarized so that it will not respond to the wave emanating from the first antenna. The polarizations of the two are said to be orthogonal."

Johnson and Jasik also disclose that the deployment of an increasing number of communications satellites has required use of the same frequency to communicate with adjacent areas on the earth. To enable such "frequency reuse", orthogonal polarizations are employed. Orthogonal circularly polarized transmitting and receiving antenna pairs, when used for frequency reuse with communications satellites, are reported to provide channel isolation in excess of 20 dB. Johnson & Jasik, at 23-4.

Current television transmission standards prescribed by the FCC at 47 C.F.R. 73.682 (a)(14) call for horizontal polarization as "standard", but allow circular or elliptical polarization to be employed if desired. In the latter case, the licensed effective radiated power (ERP) of the vertically polarized component may not exceed the licensed ERP of the horizontally polarized component.

SUMMARY OF THE INVENTION

An object of the invention is to overcome the above and other disadvantages in the HDTV systems proposed thus far.

Other objects of the presently disclosed HDTV system and technique include:

1. Full compliance with the mandates of the NOI of Sep. 1, 1988, with respect to a new terrestrial ATV service.

2. Compatibility with all existing receivers manufactured to receive broadcast television signals generated in accordance with current transmission standards as prescribed by the FCC at 47 C.F.R. 73.682, relevant portions of which are incorporated by reference herein.

3. No need for special converters or other decoding devices to be used with existing receivers, so as to permit continuing reception of television programs when broadcast with a HDTV signal according to the present technique.

4. Little, if any, degradation in picture quality when a HDTV signal transmitted according to the present technique is received and demodulated by the existing receivers.

5. No requirement of increased channel bandwidth or new spectrum allocations for implementation of the present HDTV system.

6. A minimum number of new broadcast standards that need be established, thus facilitating the regulatory implementation of the present system.

7. An opportunity for certain technologies to advance and new manufacturing methods to evolve, as components of the present system are produced to meet commercial demands.

The present technique for broadcasting high definition television (HDTV) signals on a radio frequency carrier wave, so that the broadcast HDTV signals are compatible with television receivers that operate to reproduce standard definition images, and the broadcast HDTV signals are contained within a frequency band or channel in the electromagnetic spectrum allocated for transmission of the standard definition images, includes the steps of:

(a) scanning an image to be broadcast with high definition television camera means capable of producing a high definition image frame having a resolution of N lines, wherein N is a positive number equal to about twice the resolution of a standard definition image frame;

(b) carrying out the scanning step (a) by scanning odd and even lines of the image and producing corresponding odd line image signals and even line image signals, so that N/2 odd line image signals and N/2 even line image signals are produced for each image frame;

(c) modulating the odd line image signals on a radio frequency (RF) carrier wave signal to produce HDTV odd line image signals occupying at most the same frequency band or channel in the electromagnetic spectrum as occupied by the standard definition images;

(d) modulating the even line image signals on a RF carrier wave signal to produce HDTV even line image signals that occupy at most said same frequency band;

(e) radiating the HDTV odd line image signals from first transmitting antenna means to produce first radiated electromagnetic waves of a first polarization; and (f) radiating the HDTV even line image signals from second transmitting antenna means to produce second radiated electromagnetic waves of a second polarization mutually orthogonal with the first polarization.

For a better understanding of the present invention, together with other and further objects, reference is made to the following description taken in conjunction with the accompanying drawing, and the scope of the invention will be pointed out in the appended claims.

DETAILED DESCRIPTION OF THE INVENTION

Figure 1:
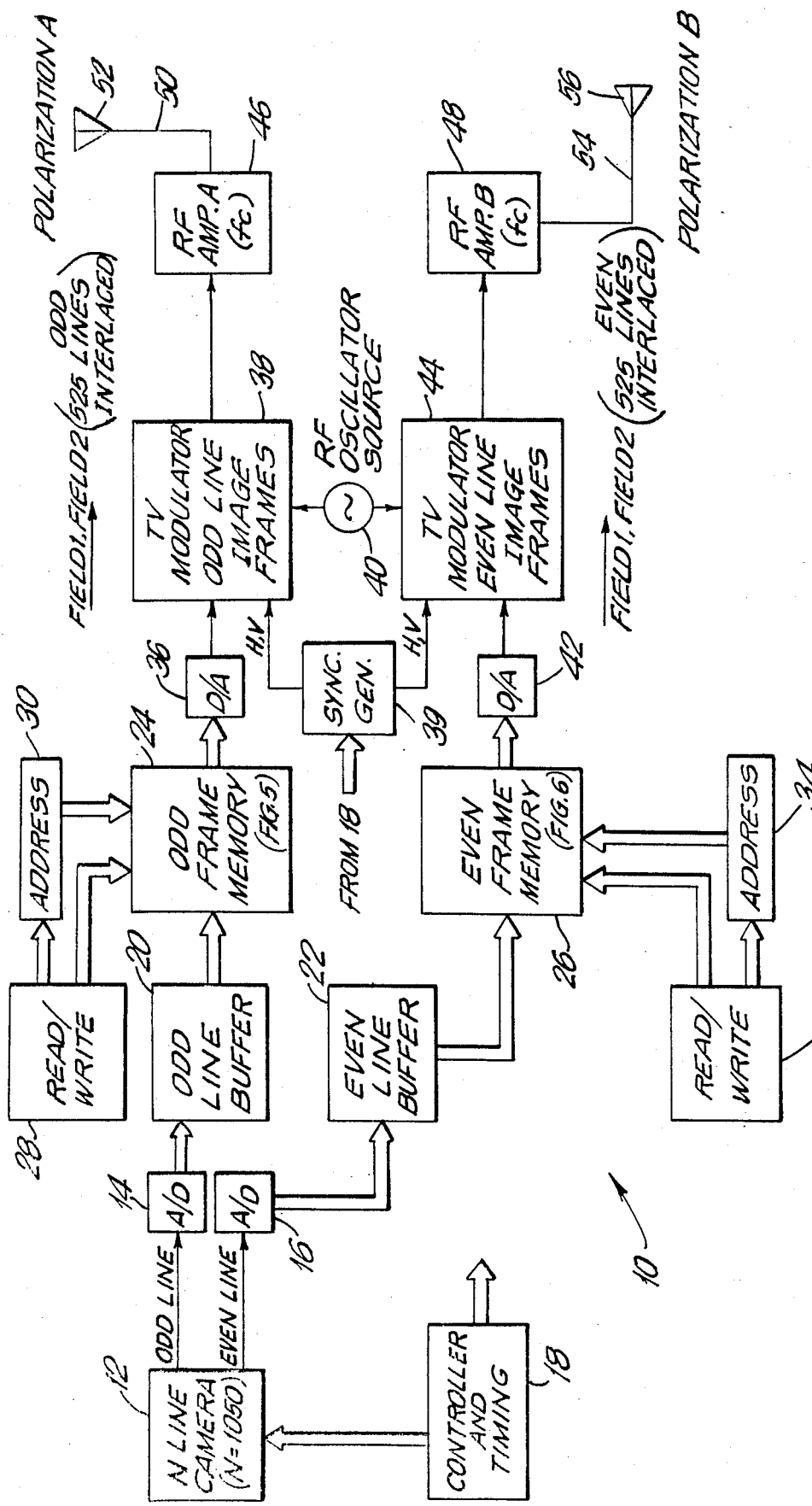
FIG. 1 is a schematic block diagram of a HDTV broadcasting system according to the invention.

FIG. 1 is a schematic block diagram of a high definition television (HDTV) broadcasting system 10 according to the invention.

Basically, system 10 includes a high definition camera source 12 of the kind disclosed in, for example, U.S. Pat. No. 4,521,803 issued June 4, 1985, or in U.S. Pat. No. 4,707,728 issued Nov. 17, 1987. Relevant portions of both patents are incorporated by reference herein. Camera source 12 includes a high-resolution color vidicon capable of scanning about twice the number of horizontal lines per image frame, than the number of lines scanned in the current NTSC broadcasting system. That is, camera source 12 is arranged to produce about 1050 horizontal lines of resolution for each image frame.

Through the use of a wobble-signal generator or similar known techniques, a scanning electron beam in the camera source 12 is caused to deviate periodically in the vertical direction while scanning horizontally. The frequency and amplitude of such deviation is set so that luminance and chrominance information corresponding to picture elements (pixels) of a pair of adjacent lines, is generated simultaneously. That is, of the 1050 horizontal lines scanned for each image frame, information for lines 1 and 2 is simultaneously generated first, then lines 3 and 4, lines 5 and 6, and so on through lines 1049 and 1050.

In the present system 10, information corresponding to the odd line (line 1, line 3, line 5, . . . , line 1049) of each adjacent pair is converted to digital form by analog-to-digital (A/D) converter stage 14, while the line pair is scanned by the camera source 12. Information corresponding to the even line (line 2, line 4, line 6, . . . , line 1050) of each adjacent pair is converted to digital form by A/D converter stage 16, while the line pair is being scanned.

Camera source 12, A/D converter stages 14 and 16, and other components of the system 10 are subject to operational timing, synchronization, and control by controller and timing circuitry 18.

Digital information corresponding to luminance and chrominance values for a number of picture elements or pixels along a given odd line, is input to odd line buffer stage 20 when supplied from the output of A/D converter 14, to be stored or latched temporarily in the buffer 20. Likewise, digital information corresponding to luminance and chrominance values for a number of pixels along a given even line, is input to even line buffer 22 stage as supplied from the output of A/D converter 16, to be stored or latched temporarily in the buffer 22. The odd and the even line buffer stages 20, 22 can be known line memory devices comprised of, e.g., serial shift registers.

Each odd line of video information lathed in the buffer 20 is written into a selected line or row address of odd frame memory stage 24. Similarly, each even line of video information latched in the buffer 22 is written into a selected line or row address of even frame memory stage 26. Each of the odd and the even frame memory stages 24, 26 may be comprised of one or more frame memory or storage devices capable of storing luminance and chrominance information for a 525 line video image, wherein a predetermined number of picture elements or pixels define each line.

Writing of each odd line of information from the odd line buffer 20 into selected row addresses of the odd frame memory 24, is performed under the control of read/write controller 28 and address select circuit 30 which, in turn, are subject to the control of controller and timing circuitry 18. Writing of each even line of information from the even line buffer 22 into selected row addresses of the even frame memory 26, is accomplished through read/write controller 32 and address select circuit 34 which, in turn, are also subject to control by the controller and timing circuitry 18.

An important feature of the present system resides in the manner in which each odd line of video information from odd line buffer 20 is first written into, and then read out from, the odd frame memory 24; and the manner in which each even line of video information from even line buffer 22 is first written into, and then read out from, the even frame memory 26.

Figure 5:
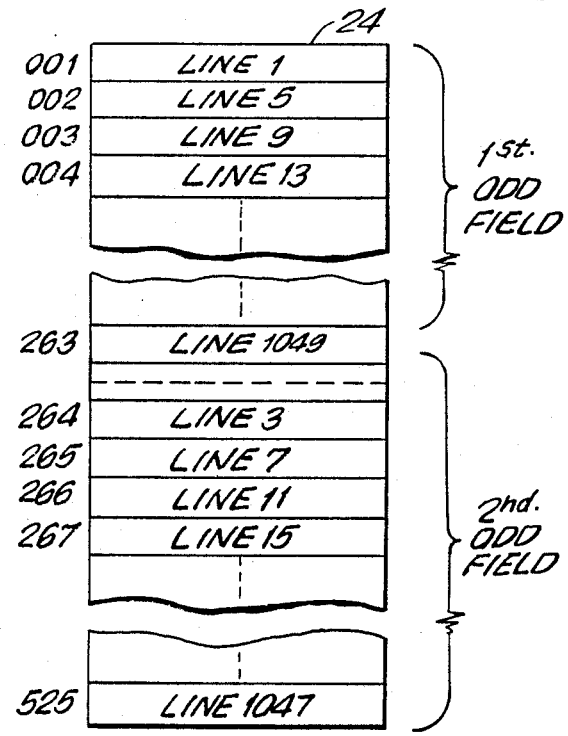
FIG. 5 is a memory map showing addresses for storage of odd image lines in a frame memory of the system in FIG. 1.

Specifically, read/write controller 28 operates so that as each odd line of video information is read out from odd line buffer 20, it is written in odd frame memory 24 at a row address as shown in the memory map of FIG. 5. That is, for odd lines 1, 5, 9, 13, . . . , 1049, the lines are written in "first odd field" row addresses 001 to 263, respectively. For odd lines 3, 7, 11, 15, . . . , 1047, the lines are written in "second odd field" row addresses 264 to 525, respectively, of the memory 24.

Figure 6:
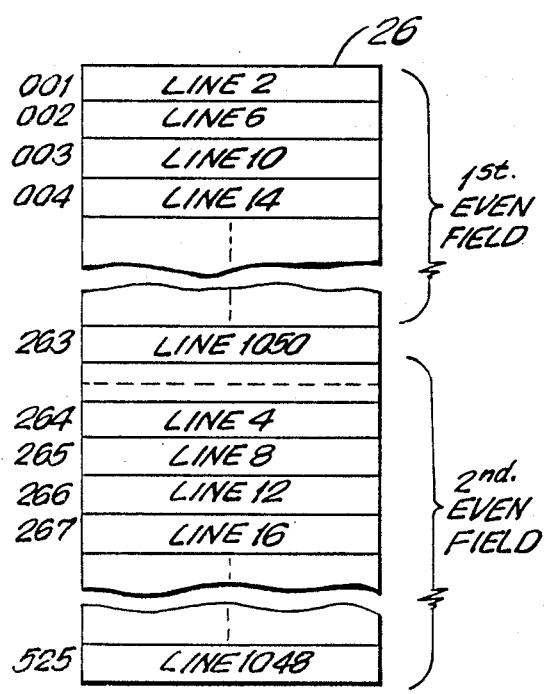
FIG. 6 is a memory map showing addresses for storage of even image lines in a frame memory of the system in FIG. 1.

Read/write controller 32 is operated such that as each even line of video information is read out from even line buffer 22, it is written in even frame memory 26 at a row address as shown in FIG. 6. Namely, for even lines 2, 6, 10, 14, . . . , 1050, the lines are written into "first even field" row addresses 001 to 263, respectively. For even lines 4, 8, 12, 16, . . . , 1048, the lines are written into corresponding "second even field" row addresses 264 to 525 of frame memory 26.

By selectively reading out the lines of video information as stored in the odd frame memory 24, an NTSC compatible, interlaced 525 line video frame signal is produced. Under the control of controller and timing circuitry 18, the read/write controller 28 successively selects row addresses 001, 002, 003, 004, . . . , 263 from which the video information stored at each row address is read out and input to D/A converter stage 36. Thus, during a first field timing period, the stored "first odd field" is converted into a conventional first field of a 525 video image frame comprised of all the odd image lines scanned by the camera source 12. During a second field timing period, read/write controller 28 successively selects row addresses 264, 265, 266, 267, . . . , 525 of the memory 24, from which video information stored at each row address is read out and input to the D/A converter stage 36. Accordingly, the stored "second odd field" is converted into a conventional second field of the 525 odd line video image frame. The first add the second fields output from D/A converter 36 are applied to a TV modulator 38 which has a radio frequency oscillator 40 that determines the broadcast carrier frequency. TV modulator 38 combines horizontal (H) and vertical (V) synchronization pulses at properly timed intervals to the stream of analog signals output from D/A converter 36. The H and the V pulses are produced by a sync generator 39 which is responsive to the controller and timing circuitry 18.

Further, by reading out lines of video information stored in the even frame memory 26, an NTSC compatible, interlaced 525 line video frame signal is produced for broadcast. During a first field timing period, which may coincide with the one mentioned above, read/write controller 32 successively selects row addresses 001, 002, 003, 004, . . . , 263 from which video information stored at each row address is read out and input to D/A converter stage 42. The stored "first even field" is thus converted into a conventional first field of a 525 line video image frame comprised of all the even image lines scanned by camera source 12. During a second field timing period (which may also coincide with the one above-mentioned), read/write controller 32 successively selects row addresses 264, 265, 266, 267, . . . , 525 of frame memory 26, from which video information stored at each row address is read out and applied to D/A converter stage 42. As a result, the stored "second even field" is converted into a conventional second field of the 525 even line video image frame. The first and second fields output from D/A converter 42 are applied to TV modulator 44 which is preferably of the same construction as TV modulator 38, and derives its broadcast carrier frequency from the common RF oscillator source 40. TV modulator 44 combines the H and the V synchronization pulses produced by sync generator 39, in correctly timed relation with the analog signals output from D/A converter 42.

The output of TV modulator 38 drives RF amplifier 46, and the output of TV modulator 44 is supplied to drive RF amplifier 48. RF amplifiers 46 and 48 may be conventional units, preferably of identical construction.

RF amplifier 46 is connected through transmission line 50 to excite antenna 52, and RF amplifier 48 has its output fed through transmission line 54 to drive antenna 56. Antennas 52 and 56 may have similar configurations and gain, but must have mutually orthogonal polarizations. For example, if antenna 52 is linearly horizontally polarized, antenna 56 must be linearly vertically polarized, or vice versa. Alternatively, antenna 52 can be circularly or elliptically polarized in a first sense of rotation, while antenna 56 is circularly or elliptically polarized in a second sense of rotation opposite to the first sense.

Antennas 52 and 56 can be located together at a common transmitting site, in which case it is preferred that known techniques for minimizing inter-element coupling between the two antennas 52, 56 be implemented.

Figure 2:
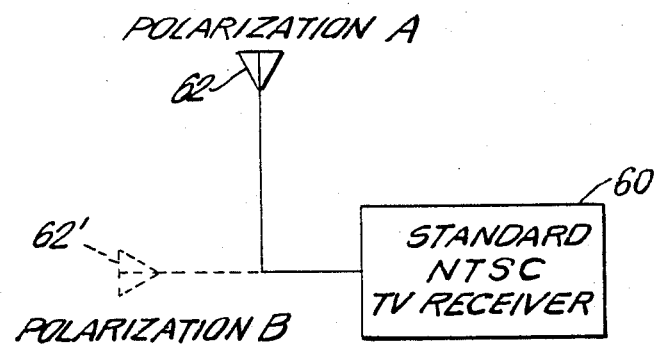
FIG. 2 is a representation of a standard TV receiver arranged to receive HDTV signals broadcast by the system of FIG. 1.

A television signal broadcast from the antennas 52, 56 can, as shown in FIG. 2, be received and viewed with a standard NTSC receiver 60. A receiving antenna 62 for the receiver 60 should have a polarization corresponding directly to one of the transmitting antennas 52, 56, e.g., polarization A corresponding to transmitting antenna 52. Alternatively, an orthogonally polarized receiving antenna 62' having polarization B corresponding to transmitting antenna 56, can be used for optimum reception by the receiver 60.

Accordingly, when using receiving antenna 62, the conventional NTSC receiver 60 will reproduce the interlaced 525 "odd line" video image frames that are output from the modulator 38, amplified by RF amplifier 46 and radiated from antenna 52. With receiving antenna 62', receiver 60 will reproduce the interlaced, 525 line "even line" video image frames that are output from the modulator 44, amplified by RF amplifier 48 and radiated from antenna 56.

Figure 3:
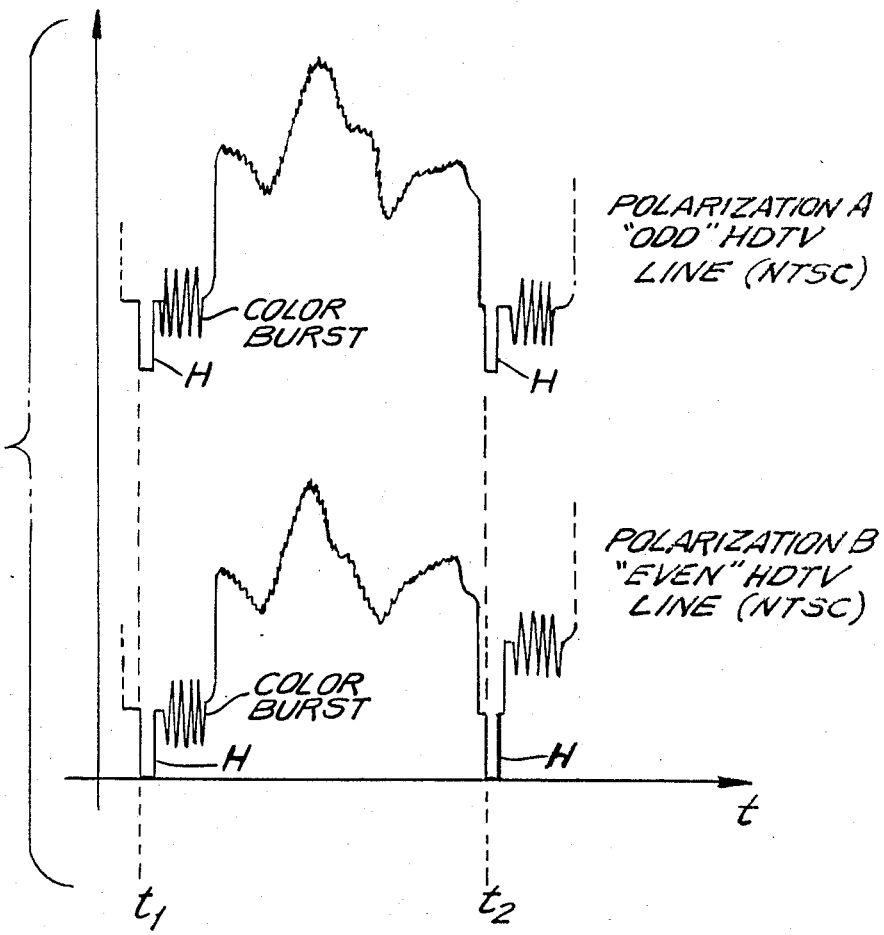
FIG. 3 is a timing diagram showing a phase relation between video signals broadcast simultaneously by the system of FIG. 1.

If the transmitting antennas 52, 56 are relatively closely situated to one another, adjacent lines of the NTSC video signals as modulated on the respective transmitted RF carrier waves, can be propagated substantially in phase as represented in FIG. 3. Accordingly, tips of corresponding horizontal synchronization pulses will be detected at substantially the same times ($t_1$, $t_2$, etc.) whether the receiver 60 responds to the carrier waves transmitted from antenna 52 or those broadcast from antenna 56. This feature of the system 10 recognizes the fact that under less than theoretically ideal conditions, receiving antenna 62 (or 62') associated with the conventional receiver 60 will also respond to some degree to orthogonally polarized waves propagating from the transmitting antenna 56 (or 52). By providing for the horizontal synchronization pulse tips of both broadcast waves to be propagated substantially in phase through space, synchronization pulses modulated on one of the orthogonally polarized waves will not be separately detected by receiver 60 possibly to interfere with detection of the video image lines modulated on the other broadcast wave whose polarization is matched by the receiving antenna 62.

Figure 4:
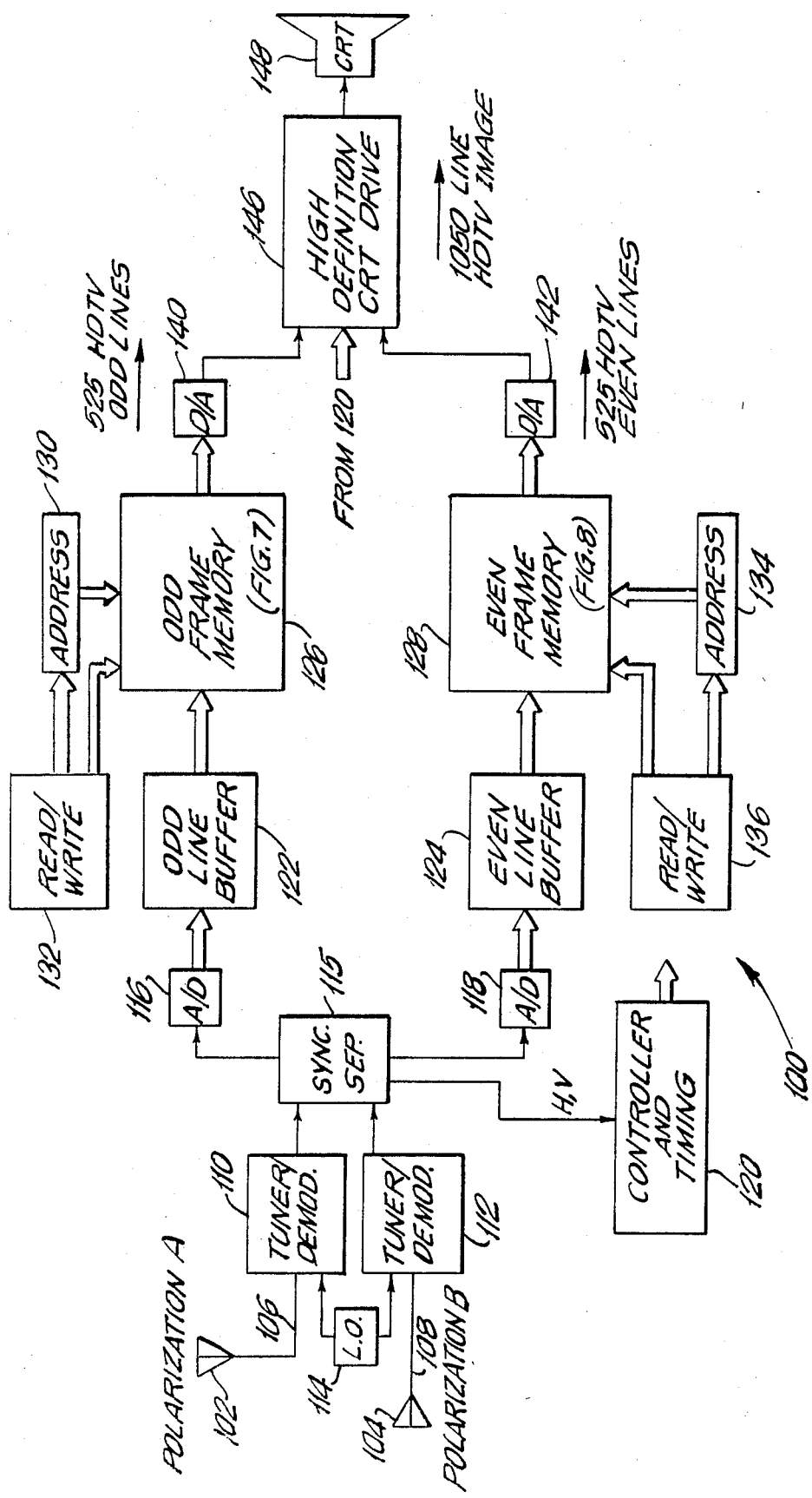
FIG. 4 is a schematic block diagram of a HDTV receiving system according to the invention.

FIG. 4 is a schematic block diagram of a HDTV receiving system 100 according to the invention.

A dual polarization receiving antenna array includes antennas 102 and 104. Antenna 102 is polarized to match the polarization A of transmitting antenna 52, while antenna 104 is of the orthogonal polarization B to match that of transmitting antenna 56. Antennas 102, 104 can be located relatively close to one another at a common receiving site. In such case, known decoupling techniques should be employed to minimize interelement coupling between the two antennas 102, 104.

Lead-in transmission lines or cables 106, 108 are connected between the antennas 102, 104 and respective tuner/demodulator systems 110, 112. The cables 106, 108 should be shielded or otherwise electrically isolated from one another. Systems 110, 112 may each include radio frequency (RF) amplifier, mixer, intermediate frequency (IF) and video detector stages. A common local oscillator stage 114 should be provided to ensure common frequency tracking by both of the tuner/demodulator systems 110, 112.

Signals output from system 110 comprise the odd lines of each 1050 line image scanned by camera source 12 of the transmitting system 10, as broadcast on a first carrier wave of polarization A. The signals output from system 112 comprise the even lines of each 1050 line image scanned by the camera source 12, as broadcast on a second carrier wave of polarization B but having the same frequency as the first carrier wave. The signals output from the tuner/demodulator systems 110, 112 may be in the form of separate luminance and chrominance signals corresponding to the image lines detected from each of the broadcast carrier waves.

After separation of the horizontal and vertical synchronization pulses from the detected video signals by sync separator 115, output signals from tuner/demodulator system 110 are input to A/D converter stage 116, and the signals produced by system 112 are input to A/D converter stage 118. A/D converter stages 116, 118 and other processing components of the receiving system 100 are subject to control by controller and timing circuitry 120 which, in turn, includes means for generating operational timing and clock signals that track the phase of the separated synchronization pulses.

Successive ones of the demodulated odd line video signals are output from A/D converter 116 and entered for temporary storage in odd line buffer or latch 122. Similarly, the demodulated even line video signals are successively output from A/D converter 118 and held in even line buffer 124. Buffers 122, 124 can be known line memory devices.

Each odd line of video information latched in the buffer 122 is written into a selected row address of odd frame memory stage 126. Similarly, each even line of video information latched in the buffer 124 is written into a selected row address of even frame memory stage 128. The odd and the even frame memory stages 126, 128 each may include one or more frame memory or storage devices capable of storing luminance and chrominance information for a 525 line video image, wherein a predetermined number of picture elements or pixels define each line.

Writing of each odd line of information from the odd line buffer 122 into selected row addresses of the odd frame memory 126, is performed under the control of address select circuit 130 and read/write controller 132 which, in turn, are subject to the control of controller and timing circuitry 120. Writing of each even line of information from the even line buffer 124 into selected row addresses of the even frame memory 128, is accomplished through write address select circuit 134 and read/write controller 136 which, in turn, are also subject to control by the controller and timing circuitry 120.

Figure 7:
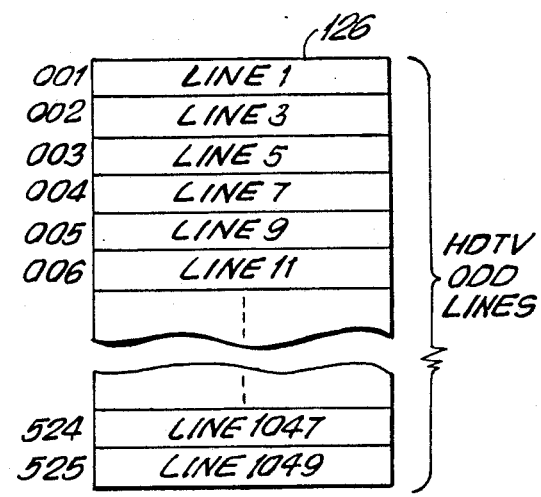
FIG. 7 is a memory map showing addresses for storage of odd image lines in a frame memory of the system in FIG. 4.
Figure 8:
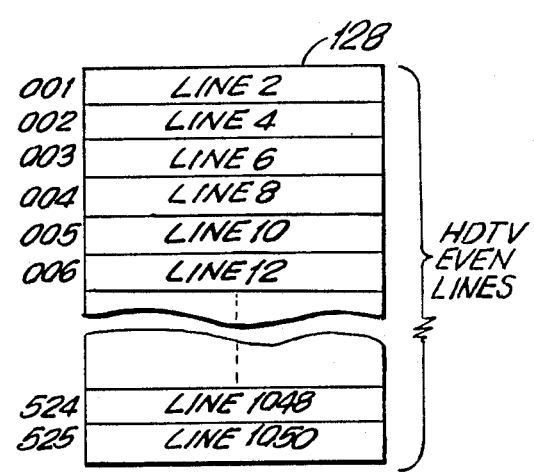
FIG. 8 is a memory map showing addresses for storage of even image lines in a frame memory of the system in FIG. 4.

FIGS. 7 and 8 are memory maps representing address storage locations in the frame memories 126, 128, respectively.

Recall that the output of the tuner/demodulator system 110 and, thus, the output of A/D converter 116, corresponds to an interlaced 525-line video frame comprised of all odd lines of the 1050 lines scanned by camera source 12 in the transmitting system 10. The line number order of the video information signals output from A/D converter 116 is, therefore, line 1, line 5, line 9, line 11, . . . , line 1049, which define the "first odd field". Next, signals representing lines 3, 7, 11, 15, . . . , 1047, are produced from A/D converter 116. In order to obtain all the odd lines of the 1050 lines scanned by camera source 12 in successive order, read/write controller 132 and address select circuit 130 operate to write each line of video information as output from odd line buffer 122 in row address locations of the odd frame memory 126, according to the memory map of FIG. 7.

Specifically, during a first odd field time period, video information corresponding to line 1 is written in row address 001, line 5 in address 003, line 9 in address 005, . . . line 1049 in address 525. That is, during the first odd field time period, the video line information is written in successive odd row addresses of frame memory 126, as output from buffer 122.

During a second odd field time period, video information corresponding to line 3 is written in row address 002, line 7 in address 004, line 11 in address 006, . . . , line 1047 in address 524. Accordingly, during the second odd field time period, the video information is written in successive even row addresses of frame memory 126, as output from buffer 122.

The 525 line video information thus stored in odd frame memory 126 forms, as shown in FIG. 7, consecutive odd numbered lines of a 1050 line image frame to be reproduced by the receiving system 100.

Likewise, it will be recalled that the output of the tuner/demodulator system 112 and, thus, the output of A/D converter 118, corresponds to an interlaced 525-line video frame comprised of all even lines of the 1050 lines scanned by camera source 12 in the transmitting system 10. The line number order of the video information signals output from A/D converter 118 is, therefore, line 2, line 6, line 10, line 14, . . . , line 1050, which define the "first even field". Next, signals representing lines 4, 8, 12, 16, . . . , 1048, are produced from A/D converter 118. In order to obtain all the even lines of the 1050 lines scanned by camera source 12 in successive order, read/write controller 136 and address select circuit 134 operate to write each line of video information as output from even line buffer 124 in row address locations of the odd frame memory 128, according to the memory map of FIG. 8.

Specifically, during a first odd field time period, video information corresponding to line 2 is written in row address 001, line 6 in address 003, line 10 in address 005, . . . line 1050 in address 525. That is, during the first even field time period, the video line information is written in successive odd row addresses of frame memory 128, as output from buffer 124.

During a second even field time period, video information corresponding to line 4 is written in row address 002, line 8 in address 004, line 12 in address 006, . . . , line 1048 in address 524. Accordingly, during the second even field time period, the video information is written in successive even row addresses of frame memory 128, as output from buffer 124.

The 525 line video information thus stored in even frame memory 128 defines, as shown in FIG. 8, consecutive even numbered lines of the 1050 line image frame to be reproduced by the receiving system 100.

Reproduction of the 1050 line high definition image by system 100 is then carried out as follows.

Row addresses of the odd frame memory 126 are selected successively by address select circuit 130, in the order 001, 002, 003, . . . , 525, and the stored line information is read out and input to D/A converter stage 140.

Row addresses of the even frame memory 126 are selected successively by address select circuit 134, in the order 001, 002, 003, . . . , 525, and the stored line information is read out and input to D/A converter stage 142.

Outputs of the D/A converters 140, 142 are supplied to a high definition CRT drive system 146 for reproduction by a 1050 line CRT 148. It is presently contemplated that CRT 148 will be driven correspondingly to the high resolution vidicon in camera source 12 of the transmitting system 10. Namely, by use of a wobble signal generator or the like, adjacent pairs of lines, wherein each pair includes an odd and an even numbered line, are swept simultaneously across the CRT face. Such an arrangement is disclosed in, for example, the earlier mentioned U.S. Pat. No. 4,707,728.

Audio signals may be frequency modulated in a conventional manner on one or both of the orthogonally polarized television signals radiated by the transmitting antennas 52, 56. Standard audio FM detector means in one or both of the tuner/demodulator systems 110, 112 then provides the detected audio to an amplifier and speaker system (not shown) associated with the receiving system 100.

Stereo sound can be realized by modulating, for example, a Left plus Right audio signal on one of the polarized transmitted signals, and a Left minus Right audio signal on the orthogonally polarized transmitted signal. When the demodulated audio signals are supplied to stereo FM decoding circuitry provided at the receiving system 100, separate Left and Right audio signals are obtained for amplification and sounding.

While the foregoing description represents a preferred embodiment of the invention, it will be obvious to those skilled in the art that various changes and modifications may be made, without departing from the true spirit and scope of the invention as pointed out in the following claims.

What is claimed is:

1. A method of broadcasting high definition television (HDTV) signals on a radio frequency carrier wave, whereby the broadcast HDTV signals are compatible with television receivers that operate to reproduce standard definition images, and the broadcast HDTV signals are contained within a frequency band or channel in the electromagnetic spectrum allocated for transmission of the standard definition images, comprising the steps of:

generating an image to be broadcast with high definition source means capable of producing a high definition image frame having a resolution of N lines, wherein N is a positive number equal to about twice the line resolution of a standard definition television image frame, and wherein successive lines n comprising the image frame are consecutively numbered from n=1 to N;

carrying out said generating step by producing odd line image signals corresponding to each odd numbered line of the image frame and producing even line image signals corresponding to each even numbered line of the image frame;

modulating the odd line image signals on a radio frequency (RF) carrier wave signal to produce HDTV odd line image signals occupying at most the same frequency band or channel in the electromagnetic spectrum as occupied by the standard definition images;

modulating the even line image signals on a RF carrier wave signal to produce HDTV even line image signals that occupy at most said same frequency band;

providing first transmitting antenna means of a first polarization;

providing second transmitting antenna means of a second polarization orthogonal to said first polarization;

radiating the HDTV odd line image signals from the first transmitting antenna means to produce first radiated electromagnetic waves of said first polarization;

simultaneously radiating the HDTV even line image signals from the second transmitting antenna means while the HDTV odd line image signals are radiated from the first transmitting antenna means, to produce second radiated electromagnetic waves of said second polarization mutually orthogonal with said first polarization; and carrying out said simultaneously radiating step so that corresponding portions of odd and even line image signals representing adjacent pairs of lines of the generated high definition image frame are propagated in phase with one another.

2. The method of claim 1, including setting N to about 1050.

3. The method of claim 1, including confining said frequency band or channel to a bandwidth of not more than 6 MHz.

4. The method of claim 1, including modulating the odd line image signals on said RF carrier wave signal in an interlaced manner by, storing, in first odd field memory means, odd line image signals corresponding to every other odd line n of a generated image progressing from n=1, 5, 9, 13, ..., wherein n is the line number, storing, in second odd field memory means, odd line image signals corresponding to every other odd line of said generated image progressing from n=3, 7, 11, 15, ..., carrying out the odd line image signals modulating step by modulating, during a first odd field, each of the odd line image signals stored in the first odd field memory means in the order of n=1, 5, 9, 13, ..., on the RF carrier wave signal, and by modulating, during a second odd field following said first odd field, each of the odd line image signals stored in the second odd field memory means in the order of n=3, 7, 11, 15, ..., on the RF carrier wave signal, whereby, in response to said first radiated electromagnetic waves, a standard television receiver operating in a 2-field interlaced scanning system will reproduce standard definition frames of the generated high definition image with each frame comprised of odd numbered lines of the high definition image.

5. The method of claim 1, including modulating the even line image signals on said RF carrier wave signal in an interlaced manner by, storing, in first even field memory means, even line image signals corresponding to every other even line n of a generated image progressing from n=2, 6, 10, 14, ..., wherein n is the line number, storing, in second even field memory means, even line image signals corresponding to every other even line of said generated image progressing from n=4, 8, 12, 16, ..., carrying out the even line image signals modulating step by modulating, during a first even field, each of the even line image signals stored in the first even field memory means in the order of n=2, 6, 10, 14, ..., on the RF carrier wave signal, and by modulating, during a second even field following said first even field, each of the even line image signals stored in the second even field memory means in the order of n=4, 8, 12, 16, ..., on the RF carrier wave signal, whereby, in response to said second radiated electromagnetic waves, a standard television receiver operating in a 2-field interlaced scanning system will reproduce standard definition frames of the generated high definition image with each frame comprised of even numbered lines of the high definition image.

6. The method of claim 4, including setting N to about 1050, and confining said frequency band or channel to not more than 6 MHz.

7. The method of claim 5, including setting N to about 1050, and confining said frequency band or channel to not more than 6 MHz.

8. The method of claim 1, including receiving either one of the first or the second radiated electromagnetic waves with antenna means having a corresponding one of said first and said second polarizations, and demodulating the received waves to reproduce standard image frames having N/2 lines of resolution.

9. The method of claim 1, including receiving both of the first and the second radiated electromagnetic waves with a pair of mutually orthogonal polarized antenna means having polarizations corresponding to those of the first and the second transmitting antenna means, and demodulating the received waves to reproduce HDTV image frames having N lines of resolution.

10. The method of claim 1, including modulating the odd line image signals and the even line image signals on respective RF carrier wave signals having the same frequency.

11. The method of claim 1, including radiating the first and the second electromagnetic waves so that synchronization pulse tips modulated on said waves are propagated in phase with one another.

12. The method of claim 1, including modulating audio signals on each of the first and the second radiated electromagnetic waves in such a manner that stereo sound can be reproduced when said waves are received and the audio signals are demodulated from the received waves.

13. A technique of transmitting high definition television (HDTV) signals on a radio frequency carrier, whereby the transmitted HDTV signals are compatible with television receivers that operate to reproduce standard definition images, and the transmitted HDTV signals are contained within frequency bands or channels in the electromagnetic spectrum allocated for transmission of the standard definition images, comprising the steps of:

generating an image to be broadcast with high definition source means capable of producing a high definition image frame having a resolution of N lines, wherein N is a positive number equal to about twice the line resolution of a standard definition television image frame, and wherein successive lines n comprising the image frame are consecutively numbered from n=1 to N;

carrying out said generating step by producing odd line image signals corresponding to each odd numbered line of the image frame and producing even line image signals corresponding to each even numbered line of the image frame;

modulating the odd line image signals on a radio frequency (RF) carrier wave signal to produce HDTV odd line image signals occupying at most a frequency band or channel that is occupied by the standard definition images;

modulating the even line image signals on a RF carrier wave signal to produce HDTV even line image signals occupying at most a frequency band or channel that is occupied by the standard definition images;

establishing a first transmission path;

establishing a second transmission path coextensive with said first transmission path;

transmitting the HDTV odd line image signals over the first transmission path;

simultaneously transmitting the HDTV even line image signals over the second transmission path while the HDTV odd line image signals are transmitted over the first transmission path; and carrying out said simultaneously transmitting step so that corresponding portions of odd and even line image signals representing adjacent pairs of lines of the generated high definition image frame are transmitted in phase with one another over the first and the second transmission paths.

14. The technique of claim 13, including setting N to equal about 1050.

15. The technique of claim 13, including confining the frequency bands or channels on which the odd and the even line image signals are modulated to bandwidths of not more than 6 MHz.

16. The technique of claim 13, including modulating the odd line image signals and the even line image signals on respective RF carrier wave signals having the same frequency.

17. The technique of claim 13, including receiving either of the transmitted HDTV odd line image signals or the transmitted HDTV even line image signals, and demodulating the received signals to reproduce standard definition television image frames.

18. The technique of claim 13, including receiving both of the transmitted HDTV odd line image signals and the transmitted HDTV even line image signals, and demodulating the received signals to reproduce high definition image frames.

19. The technique of claim 13, including transmitting audio signals over each of the first and the second transmission paths, and decoding the audio signals at a receiving location along the transmission paths to obtain stereo sound in association with the transmitted HDTV image signals.

20. A technique of transmitting high definition television (HDTV) signals on a radio frequency carrier, whereby the transmitted HDTV signals are compatible with television receivers that operate to reproduce standard definition images, and the transmitted HDTV signals are contained within frequency bands or channels allocated for transmission of the standard definition images, comprising the steps of:

generating an image to be broadcast with high definition source means capable of producing a high definition image frame having a resolution of N lines, wherein N is a positive number equal to about twice the line resolution of a standard definition television image frame, and wherein successive lines n comprising the image frame are consecutively numbered from n=1 to N;

carrying out said generating step by producing odd line image signals corresponding to each odd numbered line of the image frame and producing even line image signals corresponding to each even numbered line of the image frame;

modulating the odd line image signals on a radio frequency (RF) carrier wave signal to produce interlaced HDTV odd line image signals that occupy at most a frequency band or channel occupied by the standard definition images, by storing, in first odd field memory means, odd line image signals corresponding to every other odd line n of a generated image progressing from n=1, 5, 9, 13, ..., wherein n is the line number, storing, in second odd field memory means, odd line image signals corresponding to every other odd line of said generated image progressing from n=3, 7, 11, 15, ..., and modulating, during a first odd field, each of the odd line image signals stored in the first odd field memory means in the order of n=1, 5, 9, 13, ..., on the RF carrier wave signal, and modulating, during a second odd field following said first odd field, each of the odd line image signals stored in the second odd field memory means in the order of n=3, 7, 11, 15, ..., on the RF carrier wave signal, modulating the even line image signals on a RF carrier wave signal to produce interlaced HDTV even line image signals occupying at most a frequency band or channel occupied by the standard definition images, by storing, in first even field memory means, even line image signals corresponding to every other even line n of a generated image progressing from n=2, 6, 10, 14, ..., wherein n is the line number, storing, in second even field memory means, even line image signals corresponding to every other even line of said generated image progressing from n=4, 8, 12, 16, ..., modulating, during a first even field, each of the even line image signals stored in the first even field memory means in the order of n=2, 6, 10, 14, ..., on the RF carrier wave signal, and modulating, during a second even field following said first even field, each of the even line image signals stored in the second even field memory means in the order of n=4, 8, 12, 16, ..., on the RF carrier wave signal, establishing a first transmission path;

establishing a second transmission path;

transmitting the HDTV odd line image signals over the first transmission path; and transmitting the HDTV even line image signals over the second transmission path;

whereby, when coupled to said first transmission path, a standard television receiver operating in a 2-field interlaced scanning system will reproduce standard definition frames of the generated high definition image with each frame comprised of odd numbered lines of the high definition image, and, when coupled to said second transmission path, said standard television receiver will reproduce standard definition frames of the generated high definition image with each frame comprised of even numbered lines of the high definition image.

21. The technique of claim 20, including setting N to equal about 1050.

22. The technique of claim 20, including confining the frequency bands or channels on which the odd and the even line image signals are modulated to bandwidths of not more than 6 MHz.

23. The technique of claim 20, including modulating the odd line image signals and the even line image signals on respective RF carrier wave signals having the same frequency.

24. The technique of claim 20, including receiving either of the transmitted HDTV odd line image signals or the transmitted HDTV even line image signals, and demodulating the received signals to reproduce standard definition television image frames.

25. The technique of claim 20, including receiving, at a receiving location along the transmission paths, both of the transmitted HDTV odd line image signals and the transmitted HDTV even line image signals, and demodulating the received signals to reproduce high definition image frames.

26. The technique of claim 25, including storing, in HDTV odd line memory means at the receiving location, demodulated odd line image signals corresponding to each of the odd lines of the high definition image frame, storing, in HDTV even line memory means at the receiving location, demodulated even line image signals corresponding to each of the even lines of the high definition image frame, reading out, from the HDTV odd line memory means during an HDTV odd field, each of the stored odd line image signals in a line order of $n = 1, 3, 5, 7, \ldots$, and supplying the read out odd line image signals to HDTV display drive means for reproducing an odd high definition image field, and reading out, from the HDTV even line memory means during an HDTV even field, each of the stored even line image signals in a line order of $n = 2, 4, 6, 8, \ldots$, and supplying the read out even line image signals to HDTV display drive means, thereby reproducing an even high definition image field that is interlaced with the odd high definition image field.

27. The technique of claim 20, including transmitting audio signals over each of the first and the second transmission paths, and decoding the audio signals at a receiving location along the transmission paths to obtain stereo sound in association with the transmitted HDTV image signals.

* * * * *